United States Patent [19]

Gulistan

[11] 4,429,600
[45] Feb. 7, 1984

[54] TAMPER-PROOF SCREW ASSEMBLY

[76] Inventor: Bulent Gulistan, 20568 Pinnacle Way, Malibu, Calif. 90265

[21] Appl. No.: 390,245

[22] Filed: Jun. 21, 1982

[51] Int. Cl.³ .............................................. B25B 15/00
[52] U.S. Cl. ........................................ 81/461; 81/441; 81/459
[58] Field of Search ................. 81/461, 459, 436, 451, 81/441

[56] References Cited

U.S. PATENT DOCUMENTS

| | | | |
|---|---|---|---|
| 777,446 | 12/1904 | Strehl | 81/459 |
| 1,063,304 | 6/1913 | Titus | 81/441 |
| 1,951,584 | 3/1934 | Thompson | 81/441 |
| 1,956,963 | 5/1934 | Salmen | 81/461 |
| 2,180,633 | 11/1939 | Holt | 81/461 |
| 2,562,419 | 7/1951 | Ferris | 81/459 |
| 2,681,821 | 6/1954 | Medders | 81/459 |
| 2,770,998 | 11/1956 | Schwartz | 81/461 |
| 3,470,786 | 10/1969 | Martins | 81/461 |

FOREIGN PATENT DOCUMENTS

| | | | |
|---|---|---|---|
| 107240 | 5/1939 | Australia | 81/459 |
| 466526 | 5/1914 | France | 81/436 |
| 1424148 | 11/1965 | France | 81/461 |
| 289554 | 4/1928 | United Kingdom | 81/459 |
| 578645 | 7/1946 | United Kingdom | 81/436 |

Primary Examiner—Frederick R. Schmidt
Assistant Examiner—J. T. Zatarga
Attorney, Agent, or Firm—Ralph B. Pastoriza

[57] ABSTRACT

A tamper-proof screw assembly is made up of three basic parts, two of which are coupled together. First, there is provided a screw having a flat head with a center tapped opening and an annular array of teeth formed in its surface surrounding the tapped opening. A second member constitutes a torquing member with a flat bottom and central bore passing completely through the member. An annular array of teeth is formed in the flat bottom in a position to register with the first mentioned annular array of teeth. A third member serves to apply an axial force between the torquing member and the screw head to hold the teeth respectively in engagement with each other so that torque can be transferred to the screw. This third axial force applying member simply comprises a shaft with a threaded end portion receivable in the tapped opening and an enlarged head overlying the torquing member so that when threaded down into the tapped opening in the screw head, the torquing member when rotated will transfer torque to the screw head. Removal of the axial force applying member and torquing member leaves exposed only the flat screw head and because of the sloping teeth, it is not possible to remove the screw without the special second and third parts of the assembly.

6 Claims, 3 Drawing Figures

TAMPER-PROOF SCREW ASSEMBLY

FIELD OF THE INVENTION

This invention relates generally to fasteners and more particularly to a tamper-proof screw assembly.

BACKGROUND OF THE INVENTION

In certain situations, there is need for a tamper-proof screw for securing a panel door in a closed position such that only authorized personnel can gain access. In this respect, such a tamper-proof screw requires a design such that torque cannot be transferred to the screw by conventional tools such as pliers, wrenches, screw drivers of various types, and the like. On the other hand, the structure of the screw should not be so complicated that it cannot easily be removed and reinserted by special tools available only to those authorized to gain entry.

BRIEF DESCRIPTION OF THE PRESENT INVENTION

With the foregoing in mind, the present invention contemplates a provision of a tamper-proof screw assembly which includes, in combination, a screw having a flat head defining first and second engaging means. A torquing member, in turn, has a flat bottom defining a third engaging means positioned to cooperate with the second engaging means when positioned over the head. The second and third engaging means are so constructed that torque cannot be transferred from the torquing member to the screw head in either direction unless a very high axial force is applied to the torquing member holding it in tight engagement with the top surface of the screw. For this purpose, the assembly is completed by the provision of an axial force applying member with a fourth engaging means for engaging the first engaging means of the flat screw head in a manner to apply an axial force on the torquing member to hold the second and third engaging means in tight engagement with each other. With in such tight engagement, a torque can then be transferred from the torquing member to the screw so that the screw can be secured or removed.

When the torquing member and axial force applying member are removed after the screw has been secured, the presented flat surface prevents the use of any conventional type tools for transferring a torque to the screw head. The screw is thus essentially tamper-proof.

BRIEF DESCRIPTION OF THE DRAWINGS

A better understanding of this invention will be had by now referring to a preferred embodiment thereof as illustrated in the acompanying drawings in which.

DETAILED DESCRIPTION OF THE PREFERRED EMBODIMENT

Figure 1:
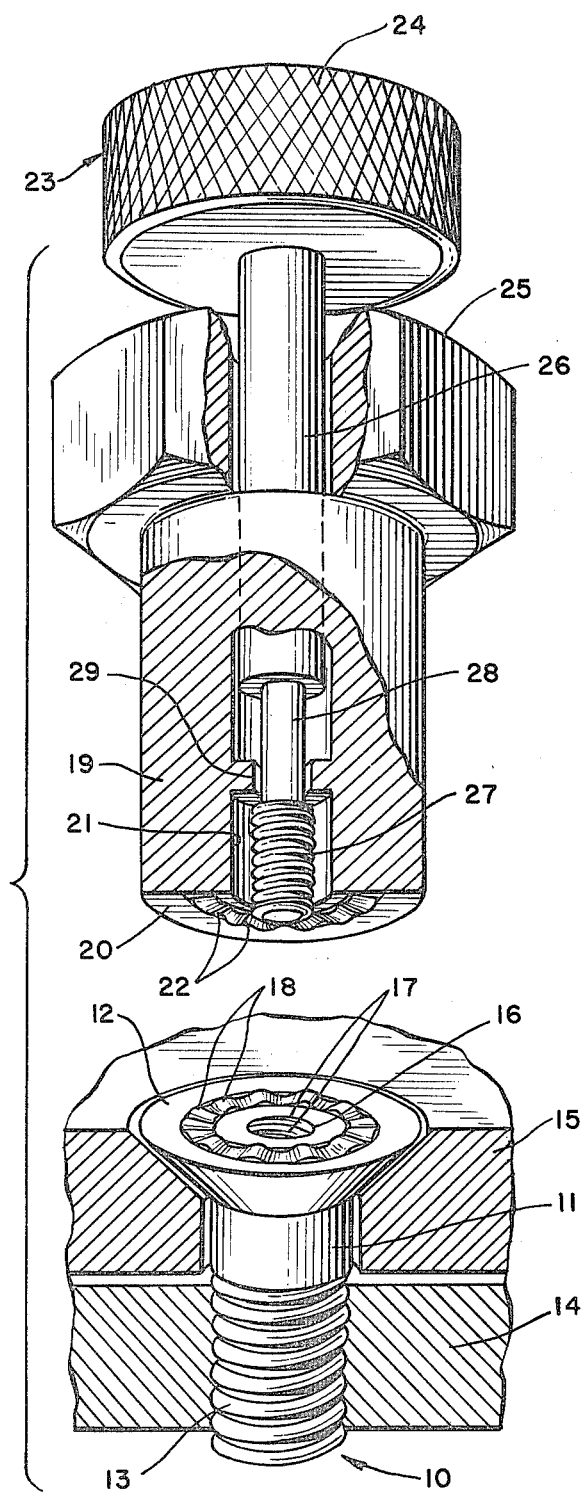
FIG. 1 is an enlarged broken away perspective view of the basic components making up the tamper-proof screw assembly of this invention.

Referring first to FIG. 1, the tamper-proof screw assembly includes a screw member designated generally by the numeral 10 in the lower portion of the drawing having a shank 11 with a flat screw head 12 at one end and a threaded portion 13 at its other end. In FIG. 1, the screw 10 is shown threaded into a panel 14 to hold an adjacent panel 15 in a secure position.

In accord with important features of this invention, the flat screw head 12 has a central opening 16 with first engaging means 17 in the opening. In the embodiment illustrated, these first engaging means comprise screw threads so that essentially, 16 is a tapped opening.

Also shown on the top surface of the flat screw head 12 is a second engaging means 18 radially spaced from the central opening 16 so as to lie between the central opening and the periphery of the head 12. In the embodiment illustrated, the second engaging means is in the form of an annular array of teeth or serrations.

Referring now to the central and upper portion of FIG. 1, the screw assembly further includes a torquing member 19 having a flat bottom 20 with a central bore 21 extending axially through the member. Also shown is a third engaging means 22 on the surface of the flat bottom 20. This third engaging means takes the form of an annular array of teeth or serrations so positioned as to register with the second engaging means 18 on the top of the screw head 12 when the torquing member 19 is positioned over the screw head.

The assembly is completed by the provision of an axial force applying member 23 having an englarged head 24 for engaging the top surface 25 of the torquing member 19. This axial force applying member 23 includes a shaft 26 extending through an axially movable in the bore 21 of the torquing member 19. Shaft 26 terminates in a fourth engaging means in the form of threads 27 for engaging the first engaging means or threads 17 in the flat screw head 12 when the shaft is received in the central opening 16.

With the foregoing arrangement, the force applying member 23 is utilized to hold the torquing member 19 in tight engagement with the top of the screw head 12 so that the second and third engaging means in the form of the serrations 18 and 22 are held together so that torque can be transferred to the screw head 12 by the torquing member 19.

Figure 2:
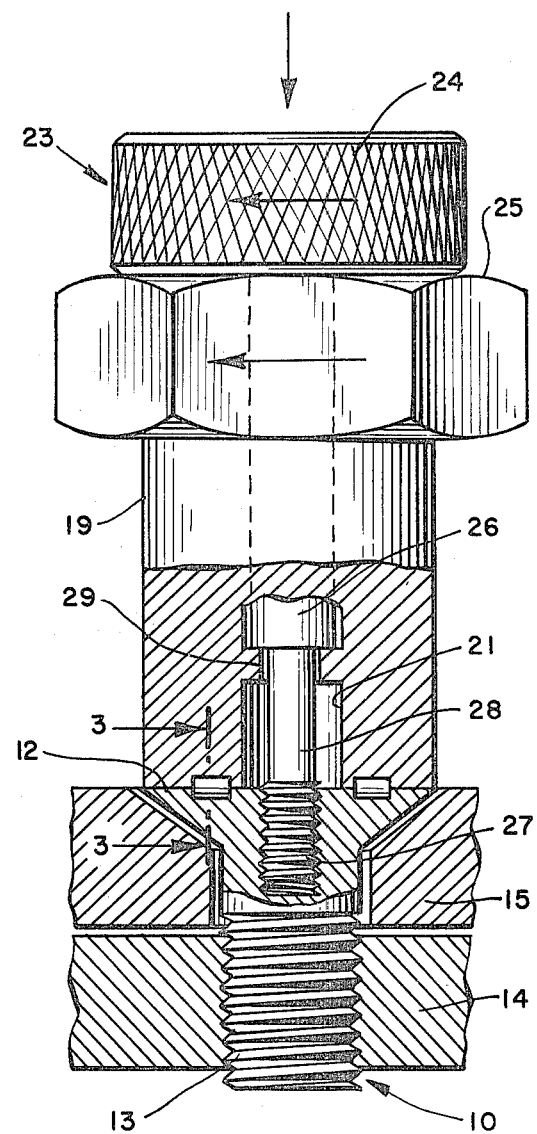
FIG. 2 is an elevational view of the components in operative relationship with each other for securing the screw.

The manner in which the foregoing takes place will be evident by referring now to the assembled view of the FIG. 2 wherein the torquing member 19 is shown positioned over the flat screw head 12. It will be noted that when the threads 27 of the axial force applying member 23 are received in the tapped opening 16 of the screw head and threaded downwardly therein, the torquing member 19 will be forced by the enlarged head 24 into tight axial engagement with the top of the screw head. As a consequence, the second and third engaging means in the form of the serrations or teeth 18 and 22 described in FIG. 1 are held in tight relationship so that torque can be transferred as indicated by the arrows in FIG. 2.

With respect to the foregoing, it will be understood that after tightening down of the torquing member 19 on top of the screw head, the force applying member 23 and the torquing member 19 will rotate as a unit in transferring torque to the screw head 12. This torque can be transferred in either direction to secure or remove the screw head.

When the screw has been secured, for example, then the actual force applying member 23 can be removed by unthreading the threads 27 from the tapped opening in the screw and removing the means 23 and thereafter simply lifting off the torquing member 19. There is thus left only the exposed surface of the screw head 12 as shown in FIG. 1 and without the special assembly tool components in the form of the torquing member 19 and the axial force applying member 23, it is not possible to remove the screw.

As a matter of convenience, and to avoid losing component parts, it is preferable that the force applying member 23 be captured to the torquing member 19 since the same will always cooperate together. Towards this end, there are provided means on the shaft 26 and bore 21 for holding the axial force applying member captive to the torquing member while permitting limited axial movement of the shaft through the bore as well as complete rotational movement. This means takes the form of a reduced diameter section 28 on the shaft 26 and a reduced diameter bore portion 29 in the bore 21. With this construction, it will be evident that the force applying member 23 is captured to the torquing member 19 and yet can move axially therein and also rotate relative thereto.

Figure 3:
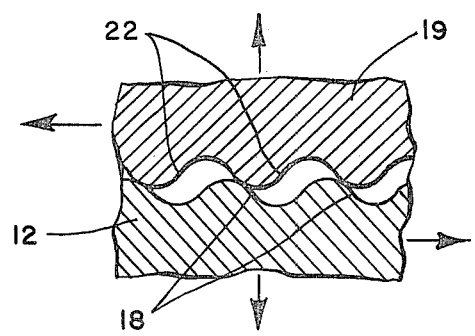
FIG. 3 is a fragmentary cross section taken in the direction of the arrows 3—3 of FIG. 2.

Referring now to the enlarged fragmentary cross section of FIG. 3, details of the annular array of teeth in the form of the serrations 18 and 22 described in FIG. 1 are shown. In FIG. 3 it will be noted that the serrations or teeth are similar to ratchet teeth except that the same have sloping sidewalls in such a manner that they tend to cam the opposed members apart when a torque is applied. Thus, the torquing member 19 itself is essentially useless for removing or tightening the screw 10 in the panel 14 since the ratchet teeth 22 will simply ride over the ratchet teeth 18. However, when the ratchet teeth 22 are held in tight engagement with the ratchet teeth 18 by means of the axial force applying member 23 described in FIGS. 1 and 2, then torque can be transferred from the third engaging means 22 to the second engaging means 18.

From all of the foregoing, it will now be evident that the present invention has provided a very effective tamper-proof screw assembly for securing a panel door, for example, against opening by unauthorized persons.

I claim:

1. A tamper proof screw assembly, including in combination:
(a) a screw having a flat head defining first and second engaging means;
(b) a torquing member having a flat bottom defining a third engaging means positioned to cooperate with said second engaging means when positioned over said head, said second and third engaging means comprising annular arrays of teeth respectively, the teeth having symmetrical sloping sides so that when engaged and a turning torque is applied in either direction, the teeth tend to cam each other out of engagement; and
(c) an axial force applying member having a fourth engaging means for engaging said first engaging means on said flat head in a manner to apply an axial force on said torquing member to hold said second and third engaging means together and thereby prevent any camming out of engagement of said second and third engaging means to enable torque to be transferred from said torquing member to said screw when securing or removing the screw.

2. An assembly according to claim 1, in which said first engaging means comprises a tapped hole in the center of said flat screw head, said fourth engaging means comprising a shaft having a threaded portion receivable in said tapped opening, said torquing member having a central bore through which said shaft passes, said shaft having a head of larger diameter than said bore at its end opposite said threaded portion to bear against the torquing member and provide sufficient axial force to hold said second and third engagement means together.

3. A tamper proof screw assembly, including in combination:
(a) a screw having a shank with a flat screw head at one end and a threaded portion at its other end, said flat screw head having a central opening, a first engaging means in said opening and a second engaging means on the surface of said flat head radially spaced from said central opening so as to lie between the central opening and the periphery of said head;
(b) a torquing member having a flat bottom with a central bore extending axially through the member, third engaging means on the surface of said flat bottom radially spaced from said central bore so as to register with said second engaging means when said torquing member is positioned over said flat head, said second and third engaging means being shaped such as to tend to separate from each other when a turning torque is applied by said torquing member in either direction in the absence of an axial force holding said second and third engaging means together; and
(c) an axial force applying member having an enlarged head engaging the top surface of said torquing member and a shaft extending through and axially movable in said bore and terminating in a fourth engaging means for engaging said first engaging means when said shaft is received in said central opening for holding said second and third engaging means in tight engaging relationship to enable torque to be applied to said screw head to secure and remove said screw from a threaded connection, removal of said torquing member and axial force applying member by disengaging the axial force applying member form said first opening, leaving only said flat head of said screw exposed, the same not being rotatable except by means of said torquing member.

4. A tamper-proof screw according to claim 3, in which said first and fourth engaging means comprise female and male threads respectively.

5. A tamper-proof screw according to claim 3, in which said second and third engaging means comprise annular arrays of teeth respectively, the teeth having sloping sides so that when engaged and a torque is applied, the teeth tend to cam each other out of engagement whereby in the absence of said first and fourth engaging means, torque cannot be effectively transferred from said torquing member to said screw head.

6. A tamper-proof screw according to claim 3, in which said shaft and bore include means holding said axial force applying member captive to said torquing member while permitting limited axial movement of said shaft in said bore.

* * * * *